United States Patent
Charopoulos et al.

(10) Patent No.: US 10,960,369 B2
(45) Date of Patent: Mar. 30, 2021

(54) CLEANING DEVICE FOR A MIXING VESSEL OF A FOOD PROCESSOR OPERATED BY AN ELECTRIC MOTOR

(71) Applicant: Vorwerk & Co. Interholding GmbH, Wuppertal (DE)

(72) Inventors: Philipp Charopoulos, Duesseldorf (DE); Robert Frielinghaus, Bochum (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 0 days.

(21) Appl. No.: 16/432,334

(22) Filed: Jun. 5, 2019

(65) Prior Publication Data

US 2019/0374915 A1    Dec. 12, 2019

(30) Foreign Application Priority Data

Jun. 6, 2018 (EP) .................................. 18176292

(51) Int. Cl.
*B01F 15/00* (2006.01)
*A47J 43/07* (2006.01)
(Continued)

(52) U.S. Cl.
CPC ..... *B01F 15/00045* (2013.01); *A47J 43/0716* (2013.01); *B01F 15/00058* (2013.01);
(Continued)

(58) Field of Classification Search
CPC .......... B01F 15/00045; B01F 15/00538; B01F 2215/0014; B01F 15/00058;
(Continued)

(56) References Cited

U.S. PATENT DOCUMENTS

| 902,577 | A | * | 11/1908 | Hall | ...................... | A47J 19/027 |
| | | | | | | 99/513 |
| 2,047,317 | A | * | 7/1936 | Esslen | ................. | B01F 7/00558 |
| | | | | | | 366/309 |

(Continued)

FOREIGN PATENT DOCUMENTS

| CA | 2358575 A1 | * | 3/2003 | ............ B01F 1/0011 |
| CA | 2376815 A1 | * | 3/2003 | ............ B01F 1/0011 |
| WO | 2016/120067 A1 | | 8/2016 | |

*Primary Examiner* — Charles Cooley
(74) *Attorney, Agent, or Firm* — Collard & Roe, P.C.

(57) ABSTRACT

A cleaning device for a mixing vessel of a food processor operated by an electric motor, wherein the mixing vessel has a vessel bottom, a circumferential wall and a cover element and can be connected to a rotary element in a torque-proof manner with the aid of a fasteners and is designed for sweeping over at least a partial area of an inner wall of the mixing vessel and mechanically removing deposits located thereon during a rotation of the rotary element about a rotational axis. The cleaning device is in the form of a bristle element or wiper element and has a C-shaped design that is in contact with the vessel bottom, the circumferential wall and the cover element such that cleaning of the vessel bottom, the circumferential wall and the cover element can take place simultaneously when the mixing vessel is closed with the cover element.

6 Claims, 8 Drawing Sheets

(51) Int. Cl.
*B08B 9/087* (2006.01)
*A47J 43/046* (2006.01)

(52) U.S. Cl.
CPC ............. *B08B 9/087* (2013.01); *A47J 43/046* (2013.01); *B01F 15/00538* (2013.01); *B01F 2215/0014* (2013.01)

(58) Field of Classification Search
CPC ............ B01F 15/00019; B01F 7/00208; A47J 43/0716; A47J 43/046; B08B 9/087
USPC ................................................. 366/309, 312
See application file for complete search history.

(56) References Cited

U.S. PATENT DOCUMENTS

| | | | | |
|---|---|---|---|---|
| 2,831,418 | A * | 4/1958 | Ponisch | A23G 1/125 99/516 |
| 3,161,404 | A * | 12/1964 | Jay | A23G 9/224 366/312 |
| 3,415,497 | A * | 12/1968 | Johnson | A47J 43/04 366/247 |
| 6,068,395 | A * | 5/2000 | Ondracek | B01F 7/00175 366/129 |
| 6,205,806 | B1 * | 3/2001 | Huang | A23G 9/12 366/309 |
| 2017/0368519 | A1 * | 12/2017 | Thies | B01F 7/162 |
| 2019/0374915 | A1 * | 12/2019 | Charopoulos | A47J 43/0716 |

\* cited by examiner

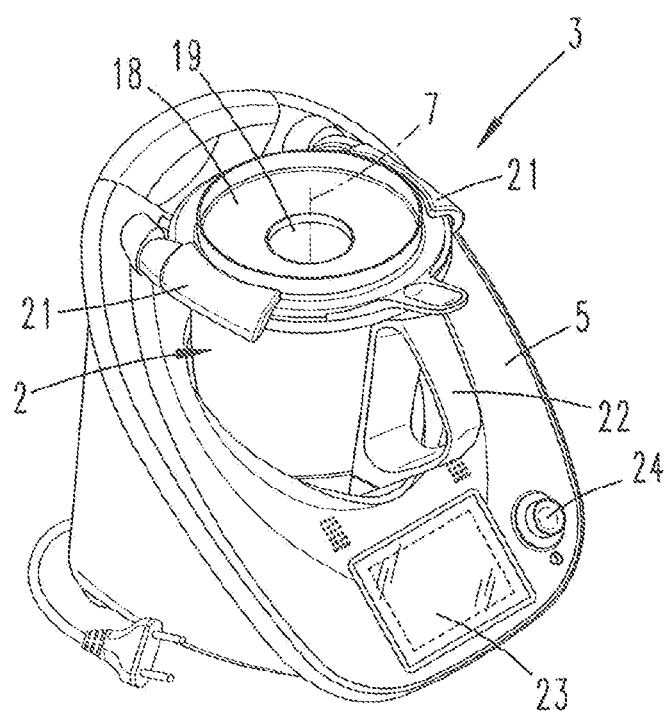

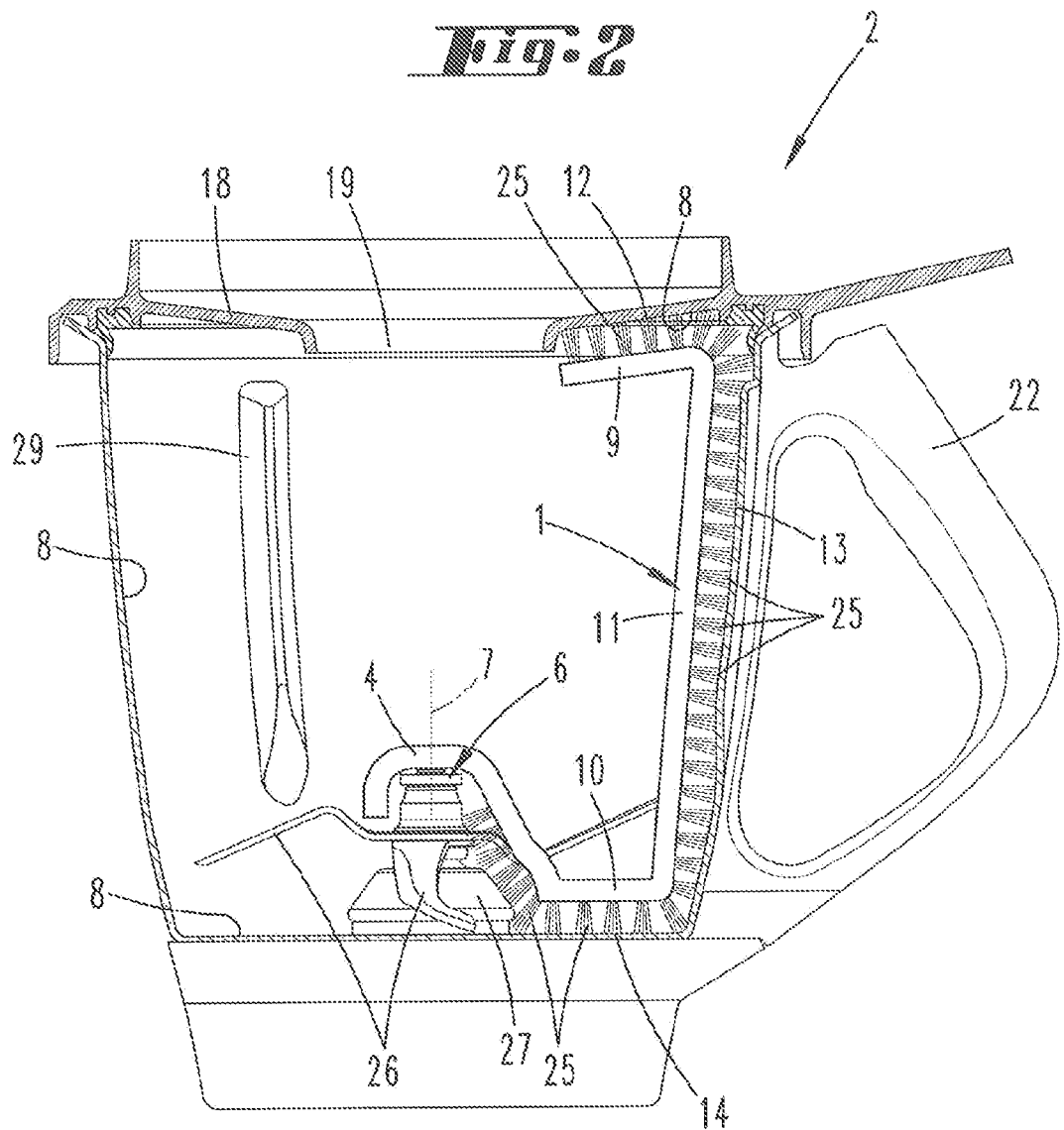

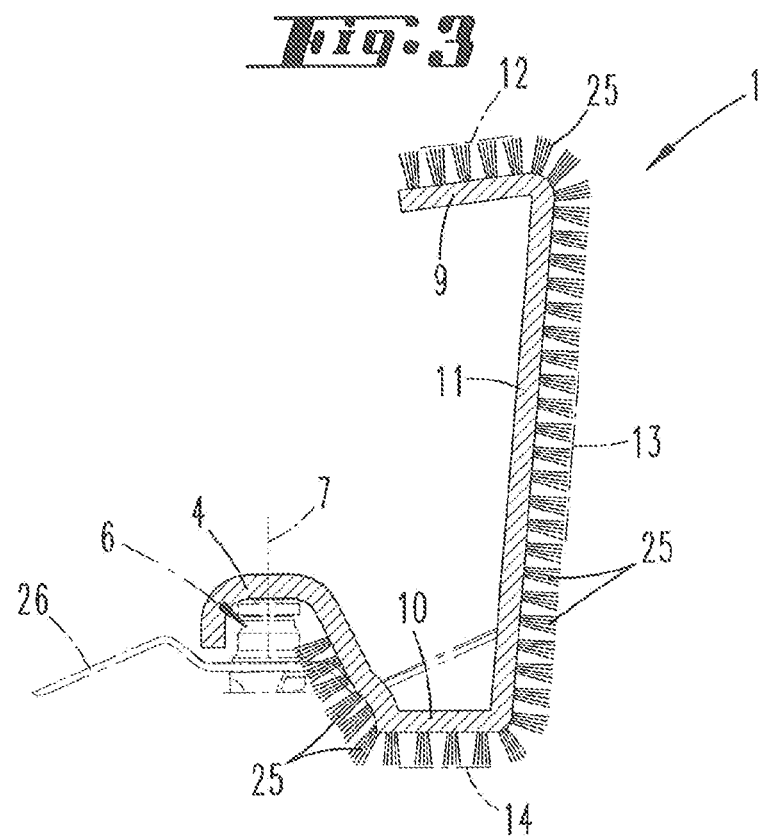
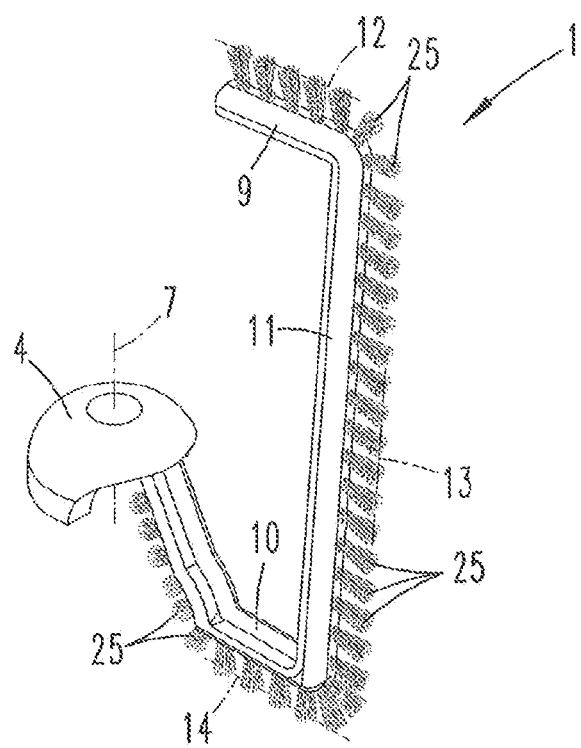

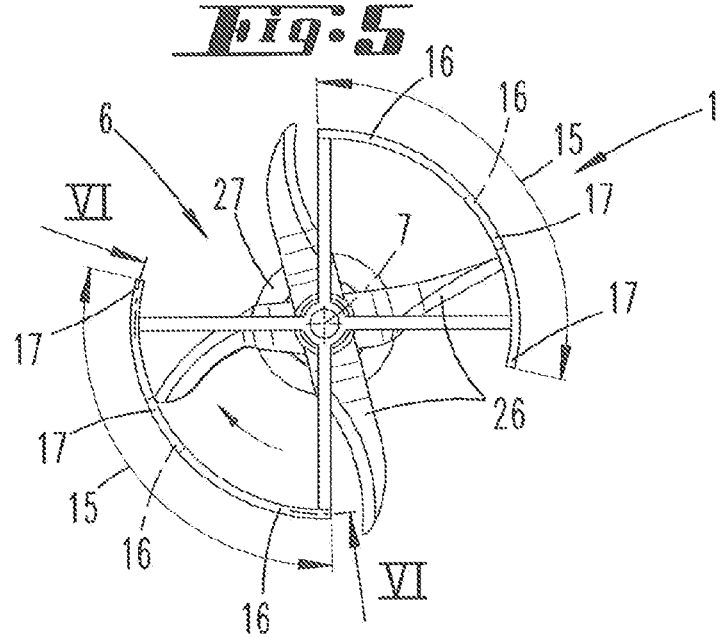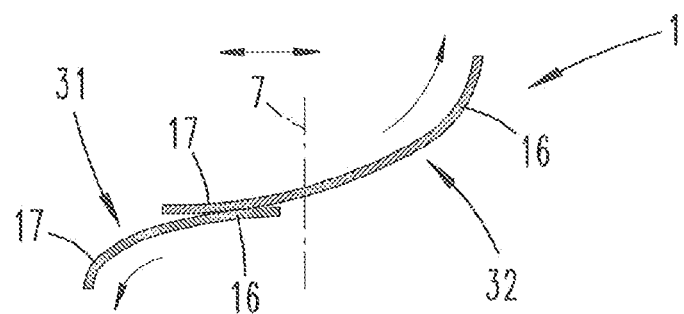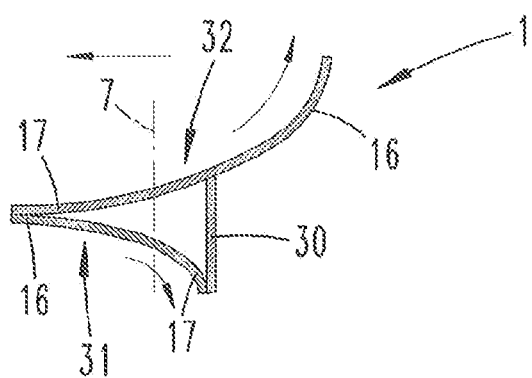

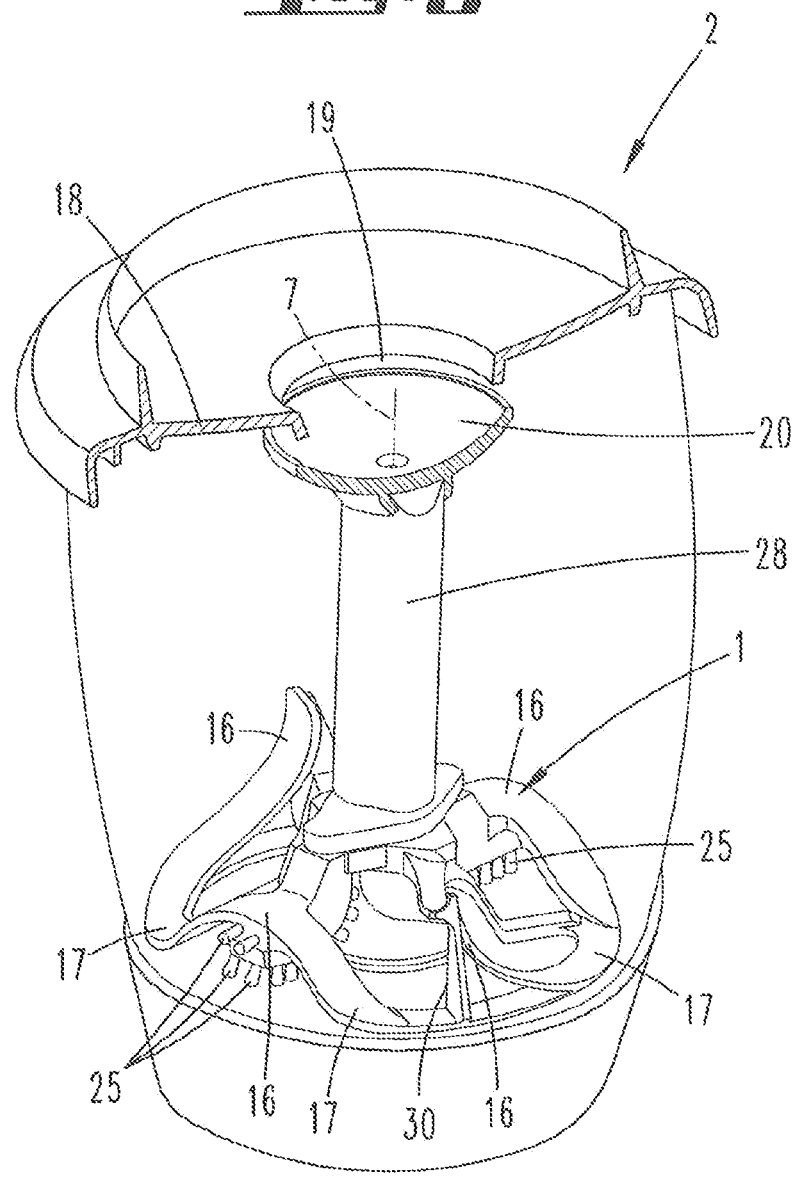

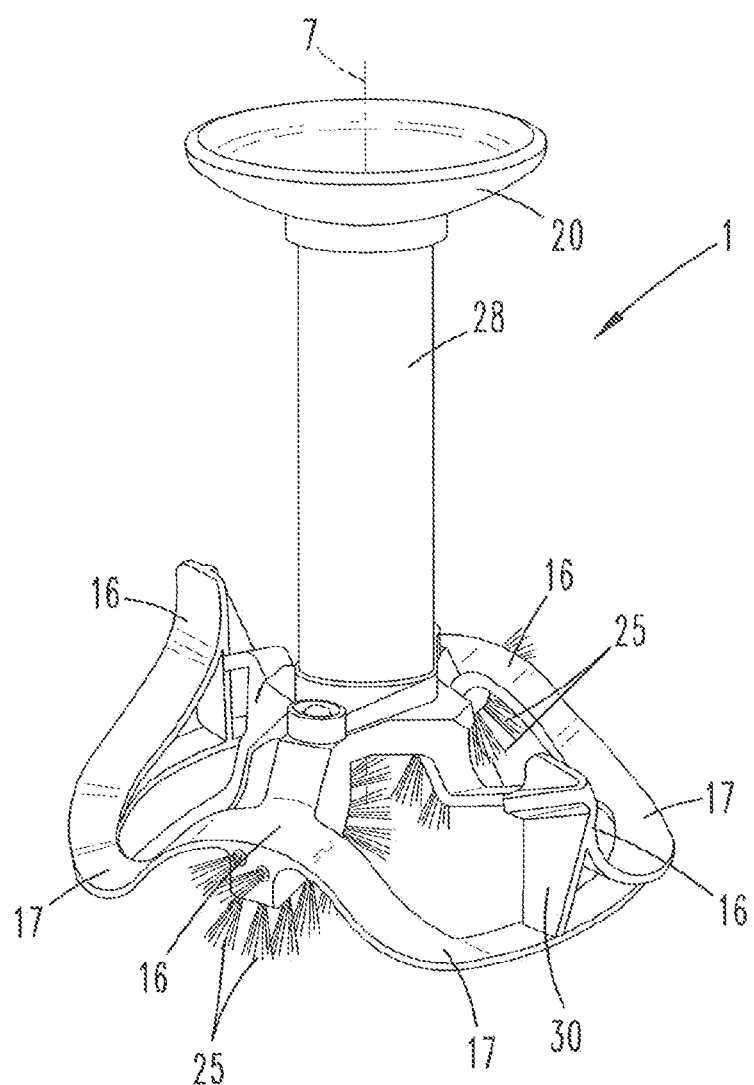

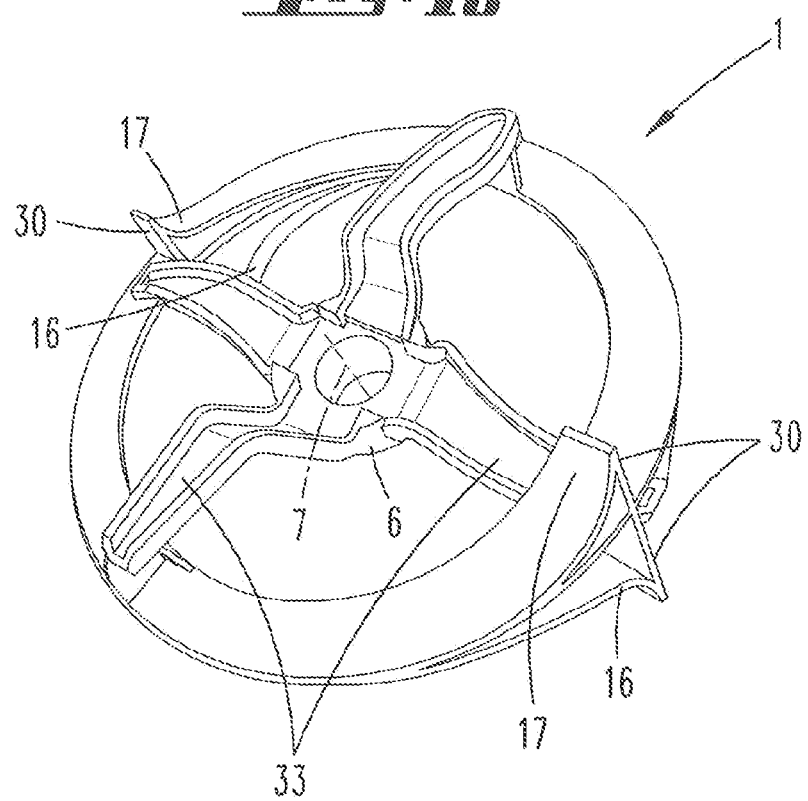

CLEANING DEVICE FOR A MIXING VESSEL OF A FOOD PROCESSOR OPERATED BY AN ELECTRIC MOTOR

CROSS-REFERENCE TO RELATED APPLICATIONS

This application claims priority under 35 USC 119 of European Patent Application No. 18176292.3, filed on Jun. 6, 2018, the disclosure of which is herein incorporated by reference.

BACKGROUND OF THE INVENTION

Field of the Invention

The invention pertains to a cleaning device for a mixing vessel of a food processor operated by an electric motor, wherein said mixing vessel comprises a vessel bottom, a circumferential wall and a cover element, wherein the cleaning device can be connected to a rotary element positioned in the mixing vessel of the food processor in a torque-proof manner with the aid of a fastening means and is designed for sweeping over at least a partial area of an inner wall of the mixing vessel and mechanically removing deposits located thereon during a rotation of the rotary element about a rotational axis, wherein the cleaning device is designed for a cleaning effect in the axial direction, as well as in the radial direction, and wherein the cleaning device has viewed in the radial direction a C-shaped design, which extends convexly outward starting from the rotational axis and comprises at least two opposed limbs and a center part connecting the two limbs to one another.

The invention also pertains to a cleaning device for a mixing vessel of a food processor operated by an electric motor, wherein the cleaning device can be connected to a rotary element positioned in the mixing vessel of the food processor in a torque-proof manner with the aid of a fastening means and is designed for removing deposits located on at least a partial area of the inner wall of the mixing vessel during a rotation of the rotary element about a rotational axis.

In addition, the invention pertains to a mixing vessel for a food processor operated by an electric motor, wherein the mixing vessel comprises a rotary element that can be connected to a driveshaft of a rotary drive of the food processor in a torque-proof manner, and wherein the mixing vessel comprises a cleaning device for cleaning an inner wall of the mixing vessel.

The invention furthermore pertains to a food processor that is operated by an electric motor and comprises a rotary drive and a mixing vessel, wherein the mixing vessel comprises a rotary element that can be connected to a driveshaft of the rotary drive in a torque-proof manner.

Prior Art

Different cleaning devices for cleaning a mixing vessel are known from the prior art. All these cleaning devices serve for removing deposits adhering to the inner wall after the preparation of meals within the mixing vessel. Known manual cleaning devices are realized, for example, in the form of brushes, sponges, steel wool and the like, by means of which the inner wall of the mixing vessel can be cleaned due to the application of a force by a user.

Furthermore, it is also known to clean a mixing vessel of a food processor operated by an electric motor in that liquid located within the mixing vessel is set in motion by means of an agitator, wherein the liquid removes deposits from the inner wall of the mixing vessel.

Publication WO 2016/120067 A1, which is also published as US 2017/0368519 A1, furthermore discloses a cleaning device to be inserted into a mixing vessel, wherein said cleaning device can be connected to a rotary element, namely an agitator, in such a way that the cleaning element is moved along during a rotation of the rotary element and sweeps over the inner wall and/or partial areas of the agitator in order to remove deposits at these locations due to mechanical interaction.

Although the aforementioned cleaning devices proved successful in the prior art, they are under certain circumstances inadequate for optimally cleaning special areas of the mixing vessel, for example a vessel bottom or an inner wall of a cover element.

SUMMARY OF THE INVENTION

The present invention is therefore based on the objective of developing a cleaning device, as well as a mixing vessel with such a cleaning device and a food processor that is operated by an electric motor and comprises such a mixing vessel, which also optimally clean soiled areas of the mixing vessel that are difficult to reach in a swift and thorough manner.

In order to attain the above-defined objective, the invention proposes that the cleaning device is in contact with the vessel bottom, the circumferential wall and the cover element such that cleaning of the vessel bottom, the circumferential wall and the cover element can take place simultaneously when the mixing vessel is closed with the cover element.

Due to the inventive C-shaped design of the cleaning device, this cleaning device has in its usual orientation partial areas that can contact a vessel bottom, a circumferential wall and an inner side of a cover element. The cleaning process therefore is not limited to only the circumferential surface of the mixing vessel, but rather also includes locations that are difficult to access, particularly the vessel bottom and the inner side of the cover element. Due to the design of the cleaning device, all cleaning steps furthermore can be carried out at the same time such that cleaning of the vessel bottom, the circumferential surface and the cover element can take place simultaneously when the mixing vessel is closed with the cover element. The proposed C-shape of the cleaning device is particularly suitable for contacting the bottom surface and the circumferential wall, as well as the cover element, and for simultaneously being realized in such a way that a flow of liquid within the mixing vessel is not impaired, but rather can be used, in particular, in an assistive manner. The C-shape allows a design of the cleaning device with a smaller width referred to the radial extent such that the liquid can flow past the cleaning device. The center part and the limbs of the C-shape can be adapted to the contour of the vessel bottom, the circumferential surface and the inner side of the cover element, preferably shaped convexly outward, wherein different curvatures and/or continuous and discontinuous sections can be realized. In this context, a C-shaped design also refers to designs that are G-shaped.

The cleaning device comprises at least one fastening element connected to the rotary element of the mixing vessel in a torque-proof manner. The fastening element particularly may form part of a plug-type connection, a screw connection, a bayonet connection, a snap-on connection and/or a magnetic connection. The cleaning device may be connected to a rotary shaft either directly or indirectly via a preparation tool, for example a blade set and/or a milk froth attachment or the like. If the cleaning device is directly connected to the rotary shaft, the user can exchange a preparation tool connected to the rotary shaft for the cleaning device. However, the cleaning device may alternatively also be fastened on an already existing preparation tool, for example a blade set, such that the cleaning device rotates along during a rotation of the preparation tool. This also applies to a milk froth attachment that is connected to the rotary element. The cleaning device advantageously comprises a central carrier element such as a plate or the like, to which the C-shape is connected. A plurality of C-shaped cleaning elements may also originate from the central carrier element. The central carrier element may be fastened on a rotary shaft directly or indirectly via an agitator, particularly a blade set and/or a milk froth attachment. The fastening element of the cleaning device preferably corresponds to the fastening means of the rotary element or the agitator, respectively. In this case, the connection may be a positive connection, a non-positive connection, a connection by magnetic force or the like. In the case of a plug-type connection, the cleaning device may comprise a partial area, into which a partial area of the rotary element can be inserted. In the case of a screw connection, a partial area of the cleaning device and a partial area of the rotary element may comprise corresponding threads that can be screwed to one another. In the case of a bayonet connection, a partial area of the cleaning device can be fixed on a partial area of the rotary element by means of a rotational/inserting motion. For example, a conventional undercut may be used in the case of a snap-on connection, wherein a partial area of the cleaning device snaps behind a corresponding partial area of the rotary element. In these variations, it is naturally advisable to realize the connection in a reversible manner such that the user can once again conveniently disengage the cleaning device from the rotary element or the agitator, respectively. This can be ensured, for example, by means of a button, handle or the like, which is arranged on the cleaning device or on the rotary element or the agitator, respectively. In the case of a magnetic connection, the cleaning device may comprise a permanent magnet that interacts with a magnetic or magnetizable partial area of the rotary element or the agitator, respectively. A magnetic material such as corrosion-resistant magnetic steel, which can also be used for food preparation, is particularly suitable for this purpose.

It is furthermore proposed that the cleaning device comprises a bristle element and/or a wiper element. The cleaning device at least sectionally comprises elements that are suitable for mechanically acting upon the inner wall of the mixing vessel including the cover element. For example, these elements may comprise bristles, textile fibers, metal fibers and/or the like. In this respect, it is vital that the cleaning elements produce a cleaning effect on the surface to be cleaned. Metal bristles or natural bristles particularly may be considered as bristles in this case. All materials that are conventionally used for cleaning cooking utensils, particularly metal pots, are basically suitable for this purpose. These materials also include, among other things, textile fibers, sponges, steel wool, etc. In this case, the individual design of the cleaning elements may be adapted to the cooking habits of a user.

It is furthermore proposed that the cleaning device comprises at least two action surfaces that are not aligned parallel to one another and essentially oriented perpendicular to one another. According to this embodiment, at least a partial area of each limb of the C-shape extends transverse to a partial area of the center part such that these partial areas are not aligned parallel to one another, but rather at an angle other than 0 degrees, preferably an angle between 60 degrees and 120 degrees, particularly between 75 degrees and 105 degrees, especially perpendicular to one another. According to this embodiment, the partial areas realized in the form of action surfaces may on the one hand serve for cleaning a circumferential surface of a mixing vessel and on the other hand for cleaning the vessel bottom of the mixing vessel or an inner wall of a cover element of the mixing vessel, respectively. Other angles between the action surfaces of the cleaning device may be advantageous if a partial area of a vessel bottom and a partial area of a circumferential wall of the mixing vessel or a partial area of the circumferential wall and a partial area of the cover element respectively do not extend perpendicular to one another. For example, some known mixing vessels widen from the vessel bottom in the direction of the cover element such that the angle between the vessel bottom and the circumferential wall is greater than 90 degrees. Furthermore, it would also be possible that an inner wall of the cover element is not realized plane, but rather curved such that the edge regions of the cover element lie lower than a center of the cover element in the attached position of the cover element on the mixing vessel and condensed vapor advantageously flows from the center of the cover element to the lateral edges, from where it can once again flow back into the mixing vessel.

It is furthermore proposed that the cleaning device is at least in partial areas made of an elastic material such that the C-shape can be compressed in the direction of the rotational axis under the influence of a force acting from radially outside and/or extended radially outward under the influence of a centrifugal force. Due to the elastic material, the cleaning device is sufficiently flexible for yielding to elevations provided on an inner side of the mixing vessel, wherein these elevations may be realized, for example, in the form of rib-shaped elements of the inner wall of the mixing vessel, which act as wave breakers within the mixing vessel and are intended to prevent the formation of a doughnut-shaped liquid spout. These wave breakers usually extend on the circumferential wall of the mixing vessel in a direction that points from the vessel bottom to the cover element. The flexibility of the material of the cleaning device furthermore makes it possible to adjust the contact pressure on the inner walls of the mixing vessel including the cover element in dependence on the centrifugal force. During the rotation of the rotary element and therefore also the rotation of the cleaning device, the cleaning device presses against surfaces of the mixing vessel, which particularly are radially spaced apart from the rotational axis, with its contact surfaces, wherein the contact pressure is adjusted in dependence on the rotational speed of the rotary element, as well as the elasticity of the material of the cleaning device. In addition, the mixing vessel preferably is filled with liquid in order to achieve optimal cleaning of the inner wall of the mixing vessel including the cover element. Examples of suitable materials for realizing the cleaning device are metals or plastics, particularly elastomers. It is important that these materials are food-safe and can come in contact with foods. If applicable, a cleaning device with a material core of elastic material and a food-safe shell may be advisable. It is vital that the overall elasticity of the material is suitable for displacing the rotary device back in the direction of a restoring force of the material, particularly against the inner walls.

The invention furthermore proposes a cleaning device for a mixing vessel of a food processor operated by an electric motor, wherein the cleaning device can be connected to a rotary element positioned in the mixing vessel of the food processor in a torque-proof manner with the aid of a fastening means and is designed for removing deposits located on at least a partial area of the inner wall of the mixing vessel during a rotation of the rotary element about a rotational axis, wherein the cleaning device is designed for a cleaning effect in the axial direction, as well as in the radial direction, wherein the cleaning device surrounds the rotational axis over at least an angular segment in the circumferential direction, and wherein the cleaning device has viewed from radially outside a wave-shaped contour, which continues in the circumferential direction and has at least one ascending wave section and at least one descending wave section, in the angular segment. The cleaning device particularly may be a cleaning device with the characteristic features of one of the above-described embodiments.

The cleaning device proposed in accordance with this modified embodiment serves for cleaning an inner wall of the mixing vessel including a cover element by means of liquid that is set in motion and particularly also splashed upward in order to thereby act upon the surfaces to be cleaned. This cleaning device is likewise designed for being connected to a rotary element of the mixing vessel or the food processor in a torque-proof manner, wherein an abrasive effect similar to a dishwasher is realized by means of the moving liquid. This particularly makes it possible to clean the entire inner wall area of the mixing vessel including the cover element with only a small amount of liquid. The inventive wave-shaped contour with at least one ascending wave section and at least one descending wave section causes a displacement of the liquid, for example, against the vessel bottom and against the cover element during the rotation of the cleaning device. For example, a segment of the wave-shaped contour, which has a leading ascending wave section and a trailing descending wave section referred to the rotating direction of the cleaning device, causes pressure to act upon the vessel bottom due to the descending wave section such that deposits or accumulations can be optimally removed from the vessel bottom. A reversal of the rotating direction subsequently makes it possible to throw the liquid against the cover element or against upper regions of the circumferential surface of the mixing vessel by means of the upwardly curved surfaces of the contour, namely one or more ascending wave sections.

In this respect, it is particularly proposed that the wave-shaped contour comprises multiple ascending wave sections and multiple descending wave sections. It is preferred that the ascending wave sections lie opposite of one another in pairs referred to the rotational axis and/or that the descending wave sections lie opposite of one another in pairs referred to the rotational axis. The opposite arrangement of the respective ascending wave sections and descending wave sections in pairs particularly leads to a rotationally symmetrical design of the cleaning device such that the centrifugal forces acting upon the contour are compensated and no imbalance of the rotary device occurs.

It is particularly proposed that the cleaning device has a closed annular contour viewed in the axial direction. This design on the one hand serves for an optimized stability of the cleaning device against the pressure of the liquid located in the mixing vessel during the rotation of the cleaning device. In addition, the closed annular contour also allows the arrangement of a plurality of ascending wave sections and descending wave sections that lie behind one another in the circumferential direction, particularly an alternating manner.

It is furthermore proposed that an ascending wave section and a descending wave section lie behind one another in a mirrored manner referred to a direction extending parallel to the rotational axis. According to this embodiment, the ascending wave sections and descending wave sections simultaneously gauge a liquid pressure that respectively acts upon the cover element and the vessel bottom or upon the upper surface areas of the circumferential wall of the mixing vessel and the lower surface areas of the circumferential wall. The liquid is simultaneously deflected on the ascending sections and descending sections during the rotation of the cleaning device. In the opposite rotating direction, which is not obstructed by any wave crests and wave troughs, the cleaning device may comprise a thrust surface of a thrust element, which essentially is oriented parallel to the rotational axis and serves for a directionally neutral distribution of the liquid. In the variation with ascending wave sections and descending wave sections that lie behind one another referred to the rotational axis and are respectively arranged in pairs, it is also sensible to realize the cleaning device symmetrical referred to the rotational axis such that pairs of identically designed ascending wave sections and descending wave sections lie opposite of one another point-symmetrically and in the same axial plane.

A bristle element and/or a wiper element may advantageously also be provided in the design of the cleaning device with a wave-shaped contour that has at least one ascending wave section and at least one descending wave section. For example, bristle elements that mechanically act upon the mixing vessel bottom may be arranged underneath the wave-shaped contour, particularly underneath a wave crest.

Both embodiments of inventive cleaning devices, i.e. the embodiment of a C-shaped cleaning device and the embodiment of a cleaning device with wave-shaped contour, preferably can be used for liquid-assisted cleaning processes. The liquid may optionally be heated within the mixing vessel in order to improve a chemical cleaning performance. A temperature of up to 60 degrees Celsius is advisable in order to remain in an optimal effective range of popular household cleaners and to largely preclude the risk of injuries for the user of the food processor. When a chemical detergent additive is used, it is advisable to suppress the formation of foam because splashing within the mixing vessel could otherwise be impaired due to the damping effect of the foam, particularly in the embodiment of the cleaning device with wave-shaped contour. Furthermore, the effect of the detergent additive should evolve as swiftly as possible in order to achieve optimal cleaning of the mixing vessel including the cover element as quickly as possible, preferably within one minute.

In addition to the above-described cleaning device, the invention furthermore proposes a mixing vessel for a food processor operated by an electric motor, wherein the mixing vessel comprises a rotary element that can be connected to a driveshaft of a rotary drive of the food processor in a torque-proof manner, wherein the mixing vessel comprises a cleaning device for cleaning an inner wall of the mixing vessel, and wherein the cleaning device is realized in accordance with one of the above-described embodiments.

The mixing vessel may therefore comprise a cleaning device according to a first embodiment, which is designed for a cleaning effect in the axial direction, as well as in the radial direction, wherein the cleaning device has viewed in the radial direction a C-shaped design, which extends convexly outward starting from the rotational axis and comprises at least two opposed limbs and a center part connecting the two limbs to one another.

According to a second embodiment, the mixing vessel may comprise a cleaning device that surrounds the rotational axis over at least an angular segment in the circumferential direction and has viewed from radially outside a wave-shaped contour with at least one ascending wave section and at least one descending wave section.

The advantages and characteristic features described above with reference to the cleaning devices also apply accordingly to the inventive mixing vessel. However, a repeated description of these characteristic features is not provided at this point.

With respect to the mixing vessel, it is furthermore proposed that this mixing vessel has a cover element with a central opening, wherein the cleaning device comprises referred to a view in the axial direction a splash protection element that covers the central opening and is designed for preventing liquid from splashing out of the central opening. The splash protection element prevents liquid from splashing out through the opening, which is usually closed by a separate closure element such as a measuring cup during the preparation of food to be prepared. If the user forgets to also insert the separate closure element into the central opening during the cleaning process of the mixing vessel, the splash protection element formed on the cleaning device prevents liquid from splashing out. For example, the splash protection element may be a body that is realized coaxial to the rotational axis of the rotary element, wherein said body forms, for example, an extension of a rotary shaft and has a diameter that is at least as large as the central opening itself. Alternatively, the splash protection element may be a screen-like element that extends radially outward from the rotational axis and completely covers the central opening referred to a view in the axial direction. The splash protection element preferably does not contact the edge region of the central opening. This ensures that the rotating splash protection element, which rotates along with the cleaning device, does not grind on or strike against the cover element. A clearance between the cover element and the splash protection element in the direction of the longitudinal extent of the rotational axis particularly is advisable.

The invention ultimately also proposes a food processor that is operated by an electric motor and comprises a rotary drive and a mixing vessel, wherein the mixing vessel comprises a rotary element that can be connected to a driveshaft of the rotary drive in a torque-proof manner, and wherein the mixing vessel is realized as proposed above, namely in the form of at least one inventive mixing vessel with an inventive cleaning device.

The food processor operated by an electric motor may be realized, for example, in the form of a combined cooking/mixing device that comprises a mixing vessel with a rotary element for driving an agitator, for example a blade set, wherein a heating device is assigned to the mixing vessel in order to heat food located in the mixing vessel.

BRIEF DESCRIPTION OF THE DRAWINGS

The invention is described in greater detail below with reference to exemplary embodiments. In the drawings:

FIG. 1 shows a food processor according to the invention,
FIG. 2 shows a mixing vessel with a cleaning device according to a first embodiment of the invention,
FIG. 3 shows a longitudinal section of the cleaning device,
FIG. 4 shows a perspective view of the cleaning device,
FIG. 5 shows a rotary element with a cleaning device according to a second embodiment of the invention,
FIG. 6 shows a partial area of the cleaning device in FIG. 5 according to a first variation,
FIG. 7 shows a partial area of a cleaning device according to a second variation,
FIG. 8 shows a mixing vessel with a cleaning device according to another embodiment of the invention with a splash protection element,
FIG. 9 shows only a cleaning device and a splash protection element according to another embodiment,
FIG. 12 shows a perspective bottom view of the cleaning device according to FIGS. 10 and 11.

DETAILED DESCRIPTION OF THE EMBODIMENTS

Figure 10:
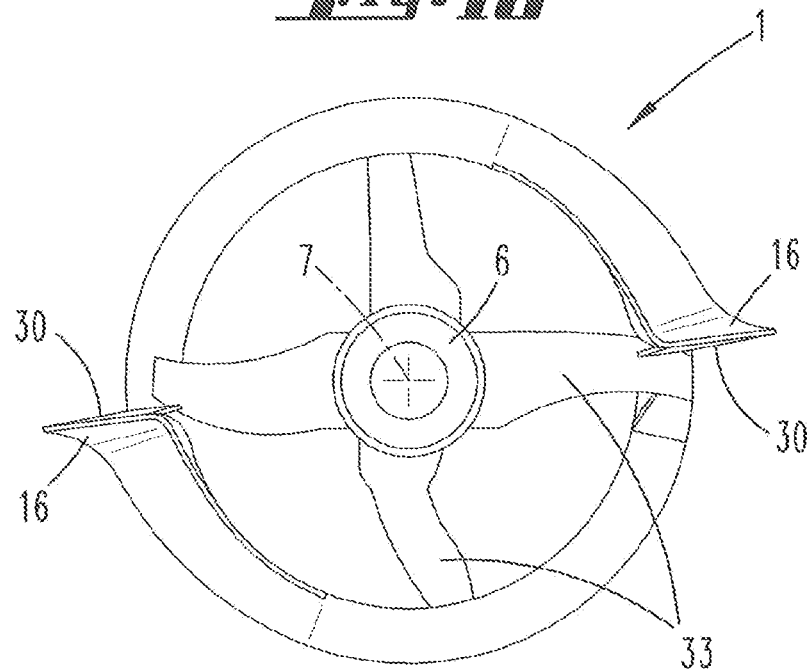
FIG. 10 shows a top view of a cleaning device according to another embodiment.

FIG. 1 shows a food processor 3 that is operated by an electric motor and in this example realized in the form of a cooking/mixing device. The food processor 3 comprises a housing 5 that forms a mixing vessel receptacle for a mixing vessel 2. The housing 5 is furthermore equipped with a display 23 and a switch 24. The food processor 3 is designed for automatically preparing a meal, wherein the user can input information concerning the selection and processing of recipes, for example, with the aid of the display 23 in the form of a touchscreen and by means of the switch 24. The preparation of foods may include, for example, chopping, stirring and heating of meals.

The mixing vessel 2 inserted into the housing 5 of the food processor 3 is closed with a cover element 18 that has a central opening 19, wherein a measuring cup, for example, can be inserted into this central opening. In this example, the cover element 18 is interlocked with the mixing vessel 2 by means of interlocking elements 21. The interlocking elements 21 are realized in the form of interlocking rollers that are rotatable about a longitudinal axis and can engage over a partial area of the cover element 18 in order to fix the cover element 18 on the mixing vessel 2. The mixing vessel 2 furthermore has a vessel handle 22, by means of which the user can insert the mixing vessel 2 into the food processor 3 and remove the mixing vessel from the food processor.

FIG. 2 shows a section through the mixing vessel 2. A rotary element 6 is arranged in the mixing vessel 2 and rotatable about a rotational axis 7. The rotary element 6 extends into the mixing vessel 2 through an inner wall 8 on the bottom side and is connected to a driveshaft of a (not-shown) electric motor of the food processor 3 in a torque-proof manner. The rotary element 6 is mounted in a rotary bearing 27 that is rigidly connected to the inner wall 8 of the mixing vessel 2. In this case, the rotary element 6 is an agitator, namely a blade set that comprises a plurality of blades 26. The blades 26 rotate relative to the rotary bearing 27 and the mixing vessel 2 during a rotation of the rotary element 6. In the context of the invention, the inner walls 8 of the mixing vessel 2 include the inner wall 8 on the bottom side, the inner wall 8 of the circumferential surface and an inner wall 8 of the cover element 18, which points in the direction of the receptacle volume of the mixing vessel. Wave breakers 29 are formed or arranged on the circumferential surface and intended to prevent the formation of a liquid spout, as well as to retain the liquid at the height of the blades 26.

A cleaning device 1 is connected to the rotary element 6 in a rotationally rigid manner. The cleaning device 1 is screwed or snapped on the rotary element 6 with the aid of fastening means 4. Other connecting variations are also conceivable. In the illustrated view, the cleaning device 1 is respectively realized in the form of a C-shaped or G-shaped body that comprises two limbs 9, 10 and a center part 11 arranged between the two limbs 9, 10. The center part 11 essentially extends parallel to the rotational axis 7. The limbs 9, 10 are at least in partial areas oriented transverse to the longitudinal extent of the center part 11. All in all, the cleaning device 1 is shaped in such a way that it rests against the inner walls 8 of the mixing vessel 2, namely the vessel bottom and the circumferential surface on the one hand and the inner side of the cover element 18 on the other hand, in a shape-corresponding manner within the mixing vessel 2. The limbs 9, 10 and the center part 11 respectively have an action surface 12, 13, 14 that serves for acting upon the associated inner wall 8. In this case, the action surfaces 12, 13, 14 are formed by outwardly directed bristle elements 25 that rest against the inner wall 8. The cleaning device 1 comprises an elastic material, in this example an elastomer, and is realized in the form of a molded part with a restoring force that acts from the rotational axis 7 in the direction of the inner walls 8 such that the cleaning device 1 is pressed against the inner wall 8 due to its inherent material stress and sweeps along and can remove deposits from the inner walls 8 during a respective rotation of the rotary element 6 or the cleaning device 1. Due to the respective elasticity of the cleaning device 1 and the bristle elements 25, the cleaning device 1 can rotate over the wave breakers 29 arranged on the circumferential surface without being damaged or causing damage.

The cleaning device 1 shown preferably is used in conjunction with a liquid such as water that is located in the mixing vessel 2. A cleaning additive suitable for removing certain deposits from the inner walls 8 may be added to the liquid.

FIGS. 3 and 4 show only the cleaning device 1, wherein FIG. 3 shows that the bristle elements 25 on the action surface 14 also point in the direction of the rotational axis 7 and can sweep over the rotary bearing 27 such that the cleaning device 1 is not only suitable for cleaning the inner walls 8 of the mixing vessel 2 including the cover element 18, but also the rotary bearing 27.

In the region of the rotary element 6, the cleaning device 1 comprises the fastening means 4 that is equipped, for example, with an internal thread, into which a threaded end region of the rotary element 6 can be screwed. The fastening means covers the end region of the rotary element 6 like a covering cap. This is illustrated in FIG. 4.

FIGS. 5 to 12 show other embodiments of an inventive cleaning device, in which cleaning of the inner walls 8 is achieved by acting thereupon with splash liquid.

FIG. 5 initially shows a rotary element 6 with blades 26 connected thereto in a torque-proof manner, as well as a cleaning device 1 arranged thereon in a torque-proof manner, in the form of a top view. Viewed from the radial direction, the cleaning device 1 has a wave-shaped contour over two angular segments 15 that respectively cover an angular range of slightly more than 90 degrees. FIGS. 6 and 7 show two different variations of such wave-shaped contours, wherein FIG. 6 concerns the variation shown in FIG. 5.

In the variation according to FIG. 6, the cleaning device 1 comprises in each of the angular segments 15 two partial elements 31, 32 that respectively include an ascending wave section 16 and a descending wave section 17. The partial element 31 illustrated on the left in FIG. 6 is curved downward with the descending wave section 17 whereas the partial element 32 illustrated on the right in FIG. 6 has an upwardly directed ascending wave section 16. In a transition area between the two partial elements 31, 32, these partial elements likewise have a corresponding ascending wave section 16 and a descending wave section 17, which is respectively covered by the other partial element (viewed in the direction of the rotational axis 7). In the variation according to FIGS. 6 and 7, the liquid is splashed upward on the ascending wave section 16 of the partial element 32, which is arranged on the far right in the figure, during a rotation in the clockwise direction such that the air is conveyed in the direction of the cover element 18 and/or the upper partial area of the mixing vessel 2 in order to cause a removal of food residues at these locations. During a rotation in the opposite direction, i.e. in the counterclockwise direction, the liquid located in the mixing vessel 2 is pushed in the direction of the inner wall 8 on the bottom side of the mixing vessel 2 by the descending wave section 17 of the partial element 31, which is illustrated on the left in FIG. 6, and acts upon the inner wall 8, as well as the surfaces of the rotary element 6, the rotary bearing 27 and the blades 26, at this location.

The variation of the cleaning device 1 illustrated in FIG. 7 is optimized for a single rotating direction of the cleaning device 1. In this embodiment, it is not necessary to rotate the rotary element 6 in opposite directions in order to completely clean all inner walls 8 of the mixing vessel 2 including the cover element 18. In fact, the variation according to FIG. 7 comprises two partial elements 31, 32 that lie on top of one another in the direction of the rotational axis 7 and respectively have an ascending wave section 16 and a descending wave section 17, wherein the ascending wave sections 16 and the descending wave sections 17 are in comparison with FIG. 6 directed oppositely such that an ascending wave section 16 of the partial element 32 points in the same circumferential direction as a descending wave section 17 of the partial element 31. During a rotation of this cleaning device 1 in the clockwise direction, liquid is conveyed upward on the ascending wave section 16 of the partial element 32 and simultaneously pushed downward on the descending wave section 17 of the lower partial element 31. This makes it possible to simultaneously clean the bottom surface of the mixing vessel 2, as well as the cover element 18 and the entire inner wall 8 of the circumferential surface. During a rotation of the cleaning device 1 in the counterclockwise direction, the water pushes against a thrust element that essentially is oriented parallel to the rotational axis 7. In this case, the liquid is not purposefully deflected in a certain direction.

FIGS. 8 and 9 show two further embodiments of a cleaning device that on the one hand has a closed, annular wave-shaped contour with ascending wave sections 16 and descending wave sections 17 and on the other hand comprises bristle elements 25, which sweep over the inner wall 8 on the bottom side, on its underside that faces the vessel bottom. In this embodiment, a splash protection base 28 also is respectively connected to the rotary element 6 or the cleaning device 1 in a rotationally rigid manner. In FIG. 8, the splash protection base 28 is realized integrally with the cleaning device 1. The splash protection base 28 is screwed on the cleaning device 1 in FIG. 8. The splash protection base 28 comprises a screen-like splash protection element 20, which shields a central opening 19 of the cover element 18 viewed in the axial direction, on its end in the region of the central opening 19. In this way, liquid being conveyed upward by the ascending wave sections 16 of the cleaning device 1 is prevented from escaping through the central opening 19 of the cover element 18 by the splash protection element 20. Viewed in the axial direction, the cleaning device 1 has a closed annular shape, on which two ascending wave sections 16 respectively form a wave crest and two descending wave sections 17 form a wave trough. Due to this design, it is possible to rotate the cleaning device 1 in either direction in order to clean the inner walls 8 because the cleaning device 1 has ascending wave sections 16 and descending wave sections 17, which can push the liquid upward on the one hand and downward on the other hand, for a rotation in the clockwise direction, as well as for a rotation in the counterclockwise direction.

Figure 11:
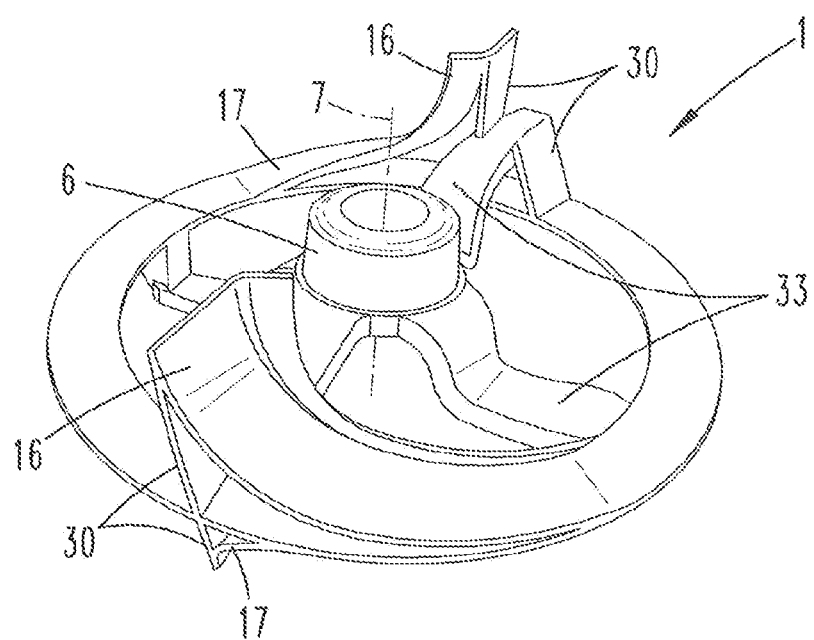
FIG. 11 shows a perspective top view of the cleaning device according to FIG. 10.

The embodiment of an inventive cleaning device 1 according to FIGS. 10 to 12 is illustrated in the form of different views, namely in the form of a top view in FIGS. 10 and 11 and in the form of a bottom view in FIG. 12. The cleaning device 1 comprises braces, which are realized such that their shape corresponds to that of blades of a blade set (see FIG. 12) and can be clipped on these blades. The figures show a closed annular contour, on which ascending wave sections 16 and descending wave sections 17 are arranged and respectively lie opposite of one another in pairs referred to the rotational axis 7. The ascending wave sections 16 and the descending wave sections 17 have the same circumferential direction, namely counterclockwise in FIG. 11, such that liquid is upwardly and downwardly conveyed against the inner walls 8 during a rotation of the cleaning device 1 in the counterclockwise direction. The cleaning device 1 respectively comprises a thrust element 30 on the side lying opposite of the ascending wave sections 16 and the descending wave sections 17 in the circumferential direction, wherein said thrust element closes the rear side of the respective ascending wave section 16 or descending wave section 17 such that liquid cannot penetrate into the gap-shaped area, but rather is distributed in different directions during a rotation of the cleaning device 1 in the clockwise direction.

FIG. 12 ultimately shows an underside of the cleaning device 1 with the braces 33 for being connected to blades of a blade set in a shape-corresponding manner. In this way, a rotationally rigid connection between the cleaning device 1 and the blade set can be ensured.

LIST OF REFERENCE SYMBOLS

1 Cleaning device
2 Mixing vessel
3 Food processor
4 Fastening means
5 Housing
6 Rotary element
7 Rotational axis
8 Inner wall
9 Limb
10 Limb
11 Center part
12 Action surface
13 Action surface
14 Action surface
15 Angular segment
16 Ascending wave section
17 Descending wave section
18 Cover element
19 Opening
20 Splash protection element
21 Interlocking element
22 Vessel handle
23 Display
24 Switch
25 Bristle element
26 Blade
27 Rotary bearing
28 Splash protection base
29 Wave breaker
30 Thrust element
31 Partial element
32 Partial element
33 Brace

What is claimed is:

1. A cleaning device for a mixing vessel of a food processor operated by an electric motor, wherein the mixing vessel comprises a vessel bottom, a circumferential wall and a cover element, wherein the cleaning device is configured to be connected to a rotary element positioned in the mixing vessel of the food processor in a torque-proof manner with the aid of a fastening element and is designed for sweeping over at least a partial area of an inner wall of the mixing vessel and mechanically removing deposits located thereon during a rotation of the rotary element about a rotational axis, wherein the cleaning device is designed for a cleaning effect in an axial direction, as well as in a radial direction, and wherein the cleaning device has, viewed in the radial direction, a C-shaped design, which extends convexly outward starting from the rotational axis and comprises at least two opposed limbs comprising a first limb and a second limb, and a center part connecting the two limbs to one another, wherein the cleaning device is configured to be in contact with the vessel bottom, the circumferential wall and the cover element when the cleaning device is positioned in the mixing vessel such that cleaning of the vessel bottom, the circumferential wall and the cover element can take place simultaneously when the mixing vessel is closed with the cover element, wherein the first limb comprises fastening means configured for connecting the cleaning device to the rotary element, and wherein the second limb is formed as a cantilevered free end portion that is not in contact with the rotary element when the cleaning device is fastened to the rotary element, wherein the cleaning device is at least in partial areas made of an elastic material such that the C-shape can be compressed in the direction of the rotational axis under the influence of a force acting from radially outside and/or extended radially outward under the influence of a centrifugal force.

2. The cleaning device according to claim 1, wherein the cleaning device comprises at least two action surfaces which are not aligned parallel to one another and are essentially oriented perpendicular to one another.

3. The cleaning device according to claim 1, wherein the cleaning device comprises a bristle element and/or a wiper element.

4. A mixing vessel for a food processor operated by an electric motor, wherein the mixing vessel comprises the vessel bottom, the circumferential wall and the rotary element, wherein the rotary element is configured to be connected to a driveshaft of a rotary drive of the food processor in a torque-proof manner, and wherein the mixing vessel comprises the cleaning device of claim 1.

5. The mixing vessel according to claim 4, further comprising the cover element with a central opening, wherein the cleaning device comprises a splash protection element that covers the central opening in the axial direction and is designed for preventing liquid from splashing out of the central opening.

6. A food processor that is operated by an electric motor and comprises a rotary drive and the mixing vessel according to claim 4, wherein the rotary element of the mixing vessel is connected to a driveshaft of the rotary drive in a torque-proof manner.

* * * * *